United States Patent
Broghammer et al.

(10) Patent No.: US 11,034,304 B2
(45) Date of Patent: Jun. 15, 2021

(54) REAR VIEW MIRROR ARRANGEMENT

(71) Applicant: Audi AG, Ingolstadt (DE)

(72) Inventors: Florian Broghammer, Ingolstadt (DE); Jörg Hornischer, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/960,661

(22) PCT Filed: Oct. 29, 2018

(86) PCT No.: PCT/EP2018/079594
§ 371 (c)(1),
(2) Date: Jul. 8, 2020

(87) PCT Pub. No.: WO2019/158233
PCT Pub. Date: Aug. 22, 2019

(65) Prior Publication Data
US 2020/0384924 A1    Dec. 10, 2020

(30) Foreign Application Priority Data
Feb. 16, 2018   (DE) .................... 10 2018 202 387.5

(51) Int. Cl.
*B60R 1/12*   (2006.01)
*B60R 1/06*   (2006.01)

(52) U.S. Cl.
CPC .................. *B60R 1/12* (2013.01); *B60R 1/06* (2013.01); *B60R 2001/1253* (2013.01); *B60R 2300/207* (2013.01); *B60R 2300/8066* (2013.01)

(58) Field of Classification Search
CPC ..... B60R 1/12; B60R 1/06; B60R 2001/1253; B60R 2300/207; B60R 2300/8066
See application file for complete search history.

(56) References Cited

U.S. PATENT DOCUMENTS 7,136,091 B2 * 11/2006 Ichikawa ................ B60R 1/00
348/148
2004/0114262 A1   6/2004 Boddy et al.
(Continued)

FOREIGN PATENT DOCUMENTS

CA        2290182 A1    7/2000
EP        1022191 A2    7/2000
(Continued)

OTHER PUBLICATIONS

International Preliminary Report on Patentability directed to related International Patent Application No. PCT/EP2018/079594, dated Aug. 18, 2020, with attached English-language translation; 11 pages.

(Continued)

*Primary Examiner* — James M Pontius
(74) *Attorney, Agent, or Firm* — Sterne, Kessler, Goldstein & Fox P.L.L.C.

(57) ABSTRACT

The present disclosure provides a rear view mirror arrangement for a motor vehicle. The rear view mirror arrangement includes an image capture unit. The image capture unit includes a housing and a camera disposed in the housing. The housing has a pane that switches between a transparent state and a reflecting state. The rear view mirror arrangement further includes a display unit for displaying an image captured by the camera. The rear view mirror arrangement operates under a camera mode and a mirror mode. When the rear view mirror arrangement is set in the camera mode, the pane is set in the transparent state so that the camera is configured to capture an image of the surroundings of the motor vehicle. When the rear view mirror arrangement is set in the mirror mode, the pane is set in the reflective state.

15 Claims, 2 Drawing Sheets

(56) References Cited

U.S. PATENT DOCUMENTS

| | | | |
|---|---|---|---|
| 2008/0013181 A1 | 1/2008 | Eckardt et al. | |
| 2009/0002491 A1* | 1/2009 | Haler | H04N 5/2251 348/148 |
| 2009/0284598 A1* | 11/2009 | Busch | B60R 1/12 348/148 |
| 2010/0001850 A1* | 1/2010 | Oh | B60R 1/12 340/438 |
| 2010/0225762 A1* | 9/2010 | Augst | B60R 1/12 348/148 |

FOREIGN PATENT DOCUMENTS

| | | |
|---|---|---|
| EP | 2025556 A2 | 2/2009 |
| JP | H05294183 A | 11/1993 |

OTHER PUBLICATIONS

International Search Report and Written Opinion of the International Searching Authority directed to related International Patent Application No. PCT/EP2018/079594, dated Dec. 12, 2018, with attached English-language translation; 14 pages.

* cited by examiner

REAR VIEW MIRROR ARRANGEMENT

TECHNICAL FIELD

The invention relates to a rear view mirror arrangement for a motor vehicle, comprising at least one image capture unit, comprising a housing and a camera accommodated in the housing, wherein the housing has at least one pane, wherein the rear view mirror arrangement further comprises a display unit for displaying a camera image.

BACKGROUND

Many vehicles have classic rear view mirrors, which are usually arranged on the outside of the vehicle body, in particular in the front area of the driver's and passenger's vehicle doors at about half the height of the vehicle. This makes a mirror image of the area behind the vehicle in the mirror visible to a driver. Classic mirror systems usually include permanent mirrors, which consist of a glass plate coated with aluminum, for example.

Nowadays, virtual rear view mirrors are being used more and more instead of classic rear view mirrors. In these well-known virtual rear view mirrors, the permanent mirrors are replaced by image capture units, each of which comprises a housing and a camera located therein. The camera records the area of the surroundings behind the motor vehicle expediently visible through the virtual rear view mirror through a transparent pane of the housing. These images are displayed to the driver via a display unit, in particular a display, arranged inside the vehicle. In contrast to the classic rear view mirror, the driver therefore no longer sees the surroundings captured by the virtual rear view mirror directly in the outside mirror, but instead in the display unit.

Experience has shown that many drivers find it difficult to use new and therefore unfamiliar technologies. Due to concerns that they may be overwhelmed, many drivers prefer well-tried and, above all, familiar systems to novel and innovative technologies. Drivers are often skeptical in particular about virtual rear view mirrors and often prefer classic rear view mirrors.

SUMMARY OF INVENTION

The embodiments of the invention are based on the object of specifying an improved rear view mirror arrangement.

To achieve this object, it is provided according to the embodiments of the invention that the rear view mirror arrangement of the type mentioned at the outset can be operated in a camera mode in which the pane, the transparency and mirroring behavior of which can be changed, is transparent, and a mirror mode in which the pane is reflective, wherein in the camera mode the camera records the surroundings of the motor vehicle through the transparent pane, the surroundings being displayed to a driver by means of the display unit, wherein in the mirror mode a mirror image of the surroundings is visible to the driver in the reflecting pane.

This advantageously results in the possibility that the rear view mirror arrangement can be operated in the camera mode or in the mirror mode. As a result, the mode desired by the driver can be set as required without much effort. As described below, this setting can be carried out, for example, by the driver himself or by a specialist workshop.

Analogous to a classic rear view mirror, the image capture unit can be arranged in the front area of the driver's or passenger's vehicle door, for example at half the vehicle height. The housing has a pane on the side which expediently faces the area located behind the vehicle. The camera is set up to record these surroundings through the pane and to transmit it to the display unit, the display unit displaying the images to the driver.

The pane is set up to change its transparency or translucency as well as its mirroring behavior or mirroring capacity. The pane can be in a reflective and a transparent state. In the reflective state, light incident on the pane is mirrored or reflected as completely as possible. The transparency of the pane is therefore as low as possible in the reflective state. On the other hand, in the transparent state, the pane has the greatest possible translucency and the smallest possible or no mirroring behavior. Light falling on the pane penetrates it in the transparent state as undisturbed as possible, apart from effects caused by light refraction.

If the rear view mirror arrangement is in camera mode, then it works according to the principle of a virtual rear view mirror which has already been explained. In this mode, the pane is in a transparent state, so that the surroundings can be recorded by the camera. The images then recorded by the camera are displayed to the driver in real time, that is to say with the least possible time delay, by the display unit.

If the rear view mirror arrangement is in the mirror mode, then it works according to the principle of a classic rear view mirror. In this mode, the pane is in a reflective state. The light incident on the pane is reflected in the direction of the driver, for whom a mirror image of the rear surroundings is visible in the pane.

The display unit of a rear view mirror arrangement according to the invention can comprise a display which, in addition to the display of the camera image, is set up to output, for example, information from a navigation system and/or the speed, and/or the current temperature, and/or the like. The display unit can in particular also be part of an infotainment system.

Alternatively or additionally, the display unit can comprise a projector for projecting an image onto an assigned projection surface. In this case, the display unit can be designed as a head-up display, the camera image being able to be projected onto the windshield of the motor vehicle or onto another suitable surface. In the event that the display unit comprises a display and a projector, it is conceivable that the driver can choose which of these two devices he would like to use.

For a rear view mirror arrangement according to the invention, it can be provided that if there is a malfunction of the camera and/or the display unit, the rear view mirror arrangement is changed to mirror mode or remains in it. In the event of a failure of one of the components required for operating the rear view mirror arrangement in camera mode, the surroundings may no longer be able to be displayed to the driver via the display unit. In contrast to a virtual rear view mirror, a rear view mirror arrangement according to the invention can be designed such that in this case the operating mode is automatically changed to the mirror mode and thereby the basic functionality of the rear view mirror arrangement, namely that the driver does not lose sight of the surroundings, in particular behind the vehicle, is preserved. In the event of a malfunction of the rear view mirror arrangement, he is therefore not necessarily forced to visit a specialist workshop immediately, but can continue to use the rear view mirror arrangement in the mirror mode. If necessary, for a rear view mirror arrangement according to the invention it can be provided that the driver is informed of the malfunction via the display unit or via an optical and/or acoustic warning signal.

For the rear view mirror arrangement according to the invention, it can be provided that the pane is connected to a control unit, the control unit being designed to change the pane from the transparent state to the mirrored state and vice versa. For example, the operating mode of the rear view mirror arrangement can be set via the control unit, as described further below, at the factory, for example, or by the driver or a specialist workshop or the like.

A relevant development of the rear view mirror arrangement according to embodiments of the invention can comprise the control unit being configured to detect the malfunction of the camera and or the display unit and, in the event of the malfunction, to change the rear view mirror arrangement into mirror mode or to leave the rear view mirror arrangement in mirror mode. For example, the control unit checks the functionality of the components involved at regular and short intervals. In the event of a component failure of the rear view mirror arrangement in camera mode, the control unit can bring this into mirror mode as quickly and automatically as possible, that is, without any action by the driver. If the rear view mirror arrangement is already in mirror mode, the control unit leaves the rear view mirror arrangement in mirror mode when a malfunction is detected.

For the rear view mirror arrangement according to embodiments of the invention, the control unit can be configured to change the rear view mirror arrangement from camera mode to mirror mode and mirror mode to camera mode if a user input is present. For this purpose, it can be provided that a button, a touchscreen, and/or a sensor for detecting a voice command or an operating movement of the driver is provided for the operator input. This allows the driver to independently switch the rear view mirror arrangement from mirror mode to camera mode and mirror mode to camera mode. For example, a driver who initially chose the classic variant instead of the virtual rear view mirror arrangement can still change the mode of the rear view mirror arrangement at his own request. In addition, for example, drivers who do not like to use display units such as displays during night driving can switch the rear view mirror arrangement to mirror mode at night.

The control unit can be configured to record at least one seat setting made by the driver, in particular the seat position, and to switch the rear view mirror arrangement into a mode assigned to this information or to leave it there. This allows a plurality of drivers who use the vehicle to determine their preferred mode of the rear view mirror arrangement in advance. The mode of the rear view mirror arrangement assigned to the respective driver can then be set automatically by the control unit identifying the seat setting typical for the respective driver.

The pane of the rear view mirror arrangement according to embodiments of the invention can comprise at least one support pane. In some embodiments, the support pane includes a film which can be switched between the transparent and the reflective state depending on the mode of the rear view mirror arrangement. The transparency and the mirroring behavior of the changeable pane therefore substantially depend on the state of the film, which typically has a thickness in the nanometer range. The switching process of the film with regard to the transparent and reflective state can, as will be described in more detail below, be carried out by applying an electrical voltage to the pane. For this purpose, the pane can be connected to the control unit that controls the electrical voltage.

The film can consist of a magnesium-titanium alloy which, depending on a hydrogen and/or oxygen concentration in an atmosphere in contact with the film, assumes the transparent or reflective state. For this purpose, the pane can comprise a support pane, a further pane, the film, an atmosphere, and an oxygen and/or hydrogen reservoir. The support pane and the further pane can be arranged substantially parallel to one another, wherein a space is provided between the panes for receiving the atmosphere and the reservoir. By applying the electrical voltage to the reservoir, an emission and/or absorption of the oxygen and/or hydrogen from the reservoir can be initiated. The duration of this process determines how long it takes the rear view mirror arrangement to switch from one operating mode to the other operating mode.

The pane of the rear view mirror arrangement according to embodiments of the invention can have a surface that is curved at least in sections. The curved surfaces of the pane allows the area of the surroundings to be seen by the driver to be expanded, in particular when the rear view mirror arrangement is in mirror mode.

In addition, a rear view mirror arrangement can comprise two or more image capture units. In some embodiments, the two or more image capture units include a first image capture unit taking over the function of the left outer mirror, a second image capture unit taking over the function of the right outside mirror, and a third image capture unit taking over the function of an inside mirror of a classic rear view mirror arrangement. All image capture units can be controlled jointly and/or individually by the driver via the control unit.

In addition, the embodiments of the invention relate to a motor vehicle comprising at least one rear view mirror arrangement of the type described herein.

For a motor vehicle according to embodiments of the invention, it can be provided that the display unit comprises a display, the display being arranged on the side of the driver's vehicle door facing the vehicle interior or on a dashboard. This advantageously has the effect that the driver always has the surroundings indicated by the display unit in his field of vision while driving.

For a motor vehicle according to embodiments of the invention, it can alternatively or additionally be provided that the display unit comprises a projector for projecting an image onto an assigned projection surface. The assigned projection surface can be the windshield of the motor vehicle, for example. In this case, the display unit is designed as a head-up display, the driver being able to see the surroundings or the camera image and, for example, the current speed, the route or the like on the windshield or front pane.

BRIEF DESCRIPTION OF THE FIGURES

Further advantages and details of the present invention shall become apparent from the exemplary embodiments described below and by means of the drawings. In the drawings.

DETAILED DESCRIPTION OF THE FIGURE

Figure 1:
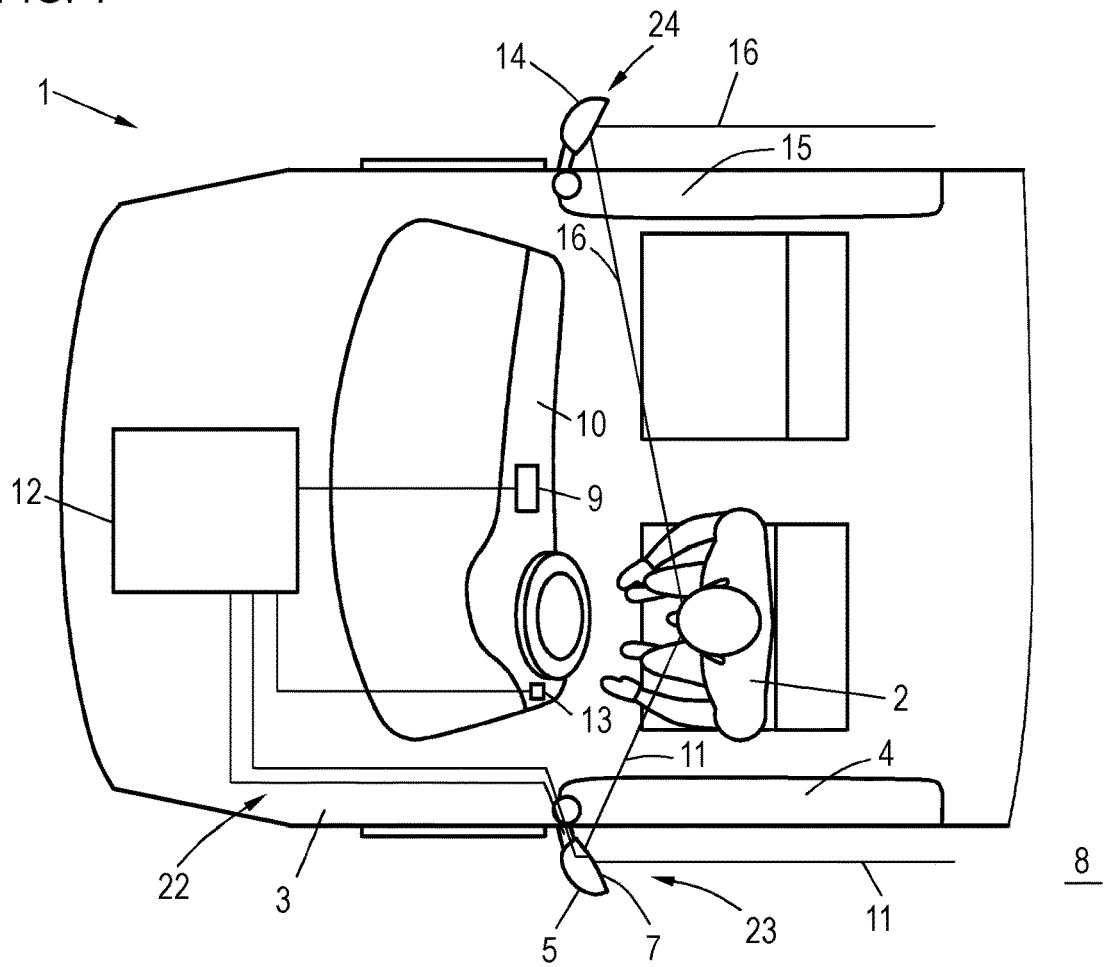
FIG. 1 is a schematic plan view of the front area of a motor vehicle comprising a rear view mirror arrangement according to an embodiment of the invention.
Figure 2:
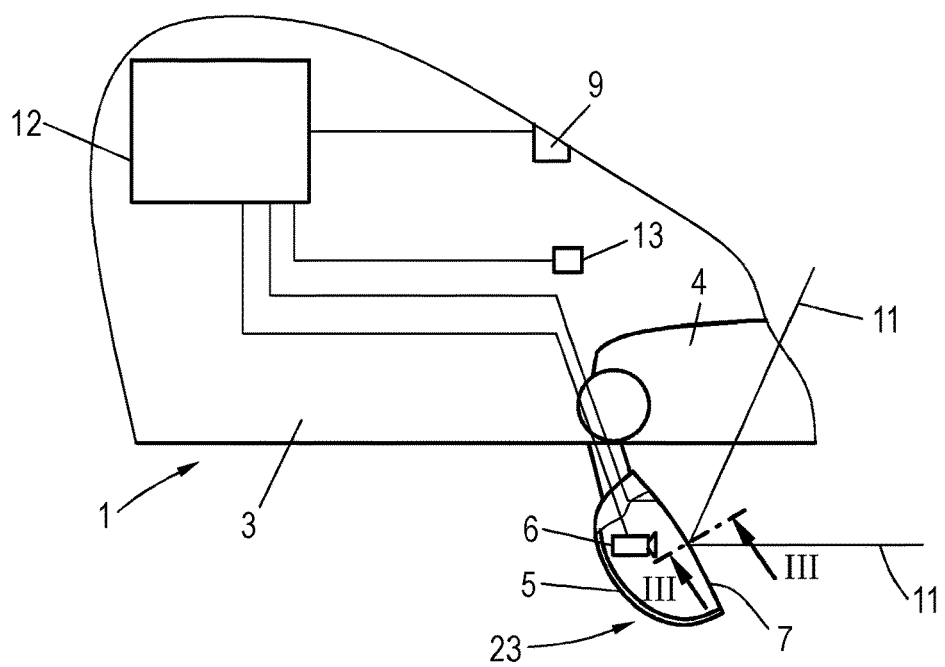
FIG. 2 is a detailed view of a section of the motor vehicle from FIG. 1.

FIG. 1 schematically shows a top view of a motor vehicle 1, comprising a rear view mirror arrangement 22 according to an embodiment of the invention, and a driver 2. A first image capture unit 23 is arranged on the body 3 of the motor vehicle 1 in the front area of the driver's vehicle door 4. In comparison to a classic rear view mirror system, the first image capture unit 23 assumes the position of the driver's outside mirror. FIG. 2 is a detailed view of a section from the motor vehicle 1 from FIG. 1 with the first image capture unit 23 opened. The first image capture unit 23 comprises a housing 5 and a camera 6 accommodated therein.

The housing 5 has a pane 7, in which the transparency and mirroring behavior of the pane 7 can be changed. The pane 7 can assume a reflective state in which light incident on the outside of the pane 7 is ideally completely reflected or mirrored. In this state, therefore, the pane 7 is as impermeable as possible to light, that is to say not transparent. Furthermore, the pane 7 can assume a transparent state in which incident light passes through the pane 7 as undisturbed as possible. In this case, the pane 7 has the greatest possible transparency, with no or almost no light being reflected. It is envisaged that the pane 7 can be switched from the reflective state to the transparent state and from the transparent state to the reflective state. As a result, the rear view mirror arrangement 22 can be operated in a camera mode and a mirror mode.

If the rear view mirror arrangement 22 operates in the camera mode, then the pane 7 is in the transparent state. The surroundings 8 to be sensibly recorded by the rear view mirror arrangement 22 can be recorded by the camera 6 due to the transparency of the pane 7. The camera 6 records images of the rear surroundings 8, which are forwarded to a display unit 9 in the form of a display and displayed there to the driver 2. The display unit 9 can be arranged on a dashboard 10 of the motor vehicle 1 in such a way that it can be seen by the driver 2 while driving.

If the rear view mirror arrangement 22 operates in the mirror mode, the pane 7 is in the reflective state. In this case, the light from the surroundings 8 does not reach the camera 6, but is reflected on the pane 7 in the direction of the driver 2. For this purpose, the pane 7 is arranged in the housing 5 such that a mirror image of the surroundings 8 reaches the driver 2. The pane 7 therefore takes on the role of the driver's side mirror in relation to a classic rear view mirror system. A line of sight 11 indicates the course of a light beam from driver 2 to surroundings 8 when the rear view mirror arrangement 22 is in mirror mode. In order to be able to set the mirror image of the surroundings 8 visible to the driver 2 in the pane 7, the orientation of the pane 7 relative to the housing 5 can be adjusted by the driver 2. For this purpose, the pane 7 is coupled to an electromechanical actuator (not shown) which can be controlled by the driver 2.

In addition, the rear view mirror arrangement 22 has a control unit 12, the basic function of which is to change the operating mode of the pane 7 or of the rear view mirror arrangement 22. The control unit 12 is connected, inter alia, to the camera 6, the display unit 9, and the pane 7. In addition, the control unit 12 is configured to detect a failure of the camera 6, the display unit 9, or another component that is important for the functionality of the rear view mirror arrangement 22 and to change the rear view mirror arrangement 22 to the mirror mode in the event of such a failure or, if it is already in the mirror mode, to leave it in this mode. By immediately switching the rear view mirror arrangement 22 to the mirror mode if one of the components described herein fails, the control unit 12 prevents the driver 2 from not having the surroundings 8 in his field of vision, but can continue to see the surroundings 8.

The control unit 12 is also connected to a button 13. The control unit 12 can be configured to detect an operator input of the driver 2, in particular a pressing of the button 13. The control unit 12 is connected to the pane 7 and is configured to control the pane 7 when the operator input is detected at the button 13 and to bring it from the reflective state to the transparent state and from the transparent state to the reflective state. This allows the driver 2 to switch back and forth between the operating modes of the rear view mirror arrangement 22 by applying finger pressure on the button 13. Alternatively, it is conceivable that the operator input is made via a touchscreen or a sensor. The sensor can, for example, be configured to detect a corresponding voice command or an operating movement of the driver 2, in particular a wiping over the sensor by hand, and to transmit a corresponding signal to the control unit 12.

A second image capture unit 24 is arranged on the motor vehicle 1 on the outside of the front passenger door 15, analogously to a rear view mirror of a classic rear view mirror system. The structure of the second image capture unit 24 corresponds to that of the first image capture unit 23, the components of the second image capture unit 24 likewise being in contact with the control unit 12. A line of sight 16 with respect to the second image capture unit 24 from the driver 2 to the surroundings 8 is shown in FIG. 1. It is conceivable for the motor vehicle 1 to include further additional image capture units which, for example, correspond to the inside mirror of the motor vehicle.

Figure 3:
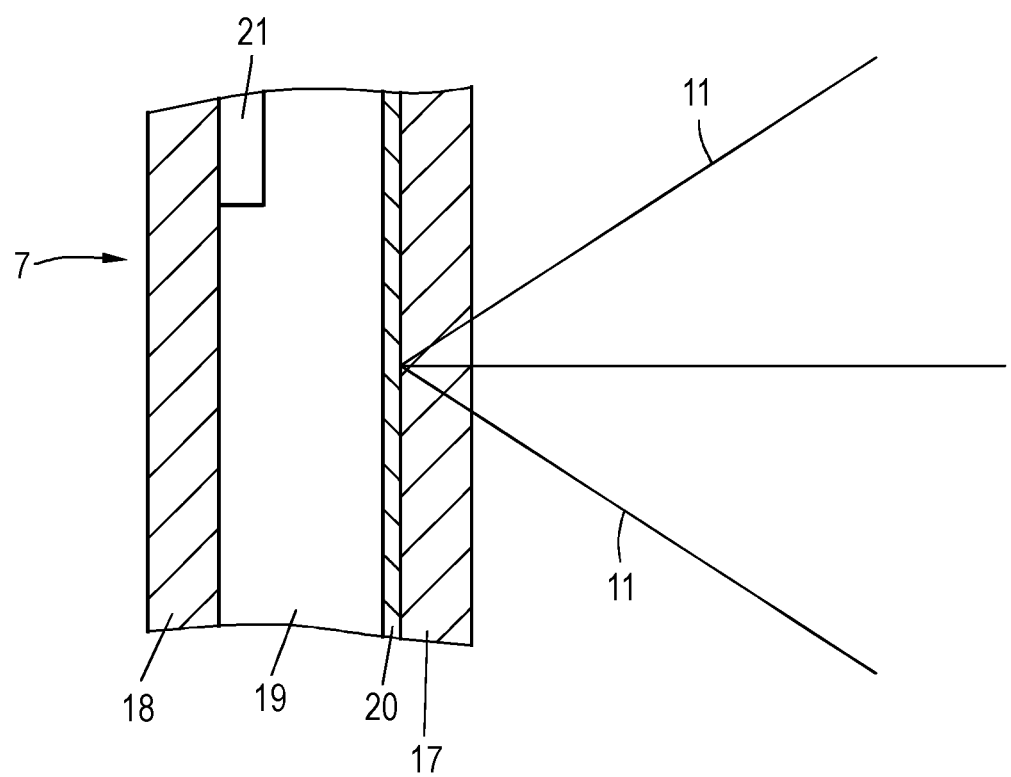
FIG. 3 is a sectional view taken along the line III-III from FIG. 2.

FIG. 3 is a sectional view along the line III-III from FIG. 2 through the pane 7. The pane 7 comprises a support pane 17, a further pane 18, and an atmosphere 19 located between the support plane 17 and the further plane 18. A film 20 is coated on the surface of the support pane 17 in contact with the atmosphere 19, the width of the film 20 is in the nanometer range. The film 20 is made of a magnesium-titanium alloy and can change from a transparent state to a reflective state. In the reflective state, an incident light beam is reflected on the pane 7 by the reflective film 20. The state of the film 20 depends on a hydrogen and/or oxygen content in the atmosphere 19. For this purpose, a reservoir 21 configured to emit or absorb hydrogen and/or oxygen is arranged between the support pane 17 and the further pane 18. When an electrical voltage is applied to the reservoir 21 by the control unit 12, these elements (e.g., hydrogen and/or oxygen) are emitted or absorbed. Alternatively, the hydrogen or oxygen content of the atmosphere 19 can be achieved by splitting water, which can also be present in the reservoir 21. The duration of this process defines how long it takes to switch the rear view mirror arrangement 22 from the mirror mode to the camera mode and from the camera mode to the mirror mode. The rear view mirror arrangement 22 is configured to do this as quickly as possible.

In order to make it possible for the driver 2 to see as large a section of the surroundings 8 as is possible for the rear view mirror arrangement 22, the pane 7 preferably has a surface that is optionally only curved in sections. As a result, the driver cannot only see the area behind the vehicle, but also get an insight into the blind spot of the motor vehicle 1.

The invention claimed is:

1. A rear view mirror arrangement for a motor vehicle, comprising:
   at least one image capture unit comprising a housing and a camera disposed in the housing and configured to capture an image, wherein the housing includes a pane comprising a film configured to switch between a transparent state and a reflective state based on a hydrogen or an oxygen concentration of an atmosphere in contact with the film, and a display unit configured to display an image captured by the camera, wherein the rear view mirror arrangement is configured to be operated under a camera mode and a mirror mode, wherein when the rear view mirror arrangement is set in the camera mode, the film of the pane is set in the transparent state such that the camera is configured to capture an image of surroundings of the motor vehicle through the transparent film of the pane, and the display unit is configured to display the captured image of the surroundings to a driver of the motor vehicle, wherein when the rear view mirror arrangement is set in the mirror mode, the film of the pane is set in the reflective state such that a mirror image of the surroundings is visible to the driver in the reflecting film of the pane.

2. The rear view mirror arrangement according to claim 1, wherein the display unit comprises a display.

3. The rear view mirror arrangement according to claim 1, wherein the display unit comprises a projector configured to project an image onto a corresponding projection surface.

4. The rear view mirror arrangement according to claim 1, wherein upon detecting a malfunction of the camera or the display unit, the rear view mirror arrangement is configured to change from the camera mode to the mirror mode or remain set in the mirror mode.

5. The rear view mirror arrangement according to claim 1, further comprising:

a control unit connected to the pane, the control unit being configured to change the film of the pane from the transparent state to the reflecting state and from the reflecting state to the transparent state.

6. The rear view mirror arrangement according to claim 5, wherein the control unit is configured to detect a malfunction of the camera or the display unit and upon detection of the malfunction of the camera or the display unit, change the rear view mirror arrangement from the camera mode to the mirror mode or keep the rear view mirror arrangement set in the mirror mode.

7. The rear view mirror arrangement according to claim 5, wherein upon detection of operator input, the control unit is configured to change the rear view mirror arrangement from the camera mode to the mirror mode or change the rear view mirror arrangement from the mirror mode to the camera mode.

8. The rear view mirror arrangement according to claim 7, wherein the control unit is connected to at least one of a button, a touchscreen, and a sensor configured to detect a voice command or an operating movement of the driver such that control unit is configured to detect operator input.

9. The rear view mirror arrangement according to claim 1, wherein the pane comprises a support pane, and the film is disposed on a surface of the support pane and is exposed to the atmosphere.

10. The rear view mirror arrangement according to claim 9, wherein the film comprises a magnesium-titanium alloy.

11. The rear view mirror arrangement according to claim 1, wherein the pane comprises a curved surface.

12. A motor vehicle comprising:

a rear view mirror arrangement, wherein the rear view mirror arrangement comprises:

at least one image capture unit comprising a housing and a camera disposed in the housing and configured to capture an image, wherein the housing includes a pane comprising a magnesium-titanium alloy film configured to switch between a transparent state and a reflective state, and a display unit configured to display an image captured by the camera, wherein the rear view mirror arrangement is configured to be operated under a camera mode and a mirror mode, wherein when the rear view mirror arrangement is set in the camera mode, the magnesium-titanium alloy film of the pane is set in the transparent state such that the camera is configured to capture an image of surroundings of the motor vehicle through the transparent magnesium-titanium alloy film of the pane, and the display unit is configured to display the captured image of the surroundings to a driver of the motor vehicle, wherein when the rear view mirror arrangement is set in the mirror mode, the pane is set in the reflective state such that a mirror image of the surroundings is visible to the driver in the reflecting pane.

13. The motor vehicle according to claim 12, further comprising:

a driver-side vehicle door, and a dashboard, wherein the display unit comprises a display, the display being disposed on a side of the driver-side vehicle door such that the display faces a vehicle interior or is disposed on the dashboard.

14. The motor vehicle according to claim 12, wherein the display unit comprises a projector configured to project an image onto a corresponding projection surface.

15. A rear view mirror arrangement for a motor vehicle, comprising:

at least one image capture unit comprising a housing and a camera disposed in the housing and configured to capture an image, wherein the housing includes a pane configured to switch between a transparent state and a reflective state, a display unit configured to display an image captured by the camera, a control unit connected to the pane, the control unit being configured to change the pane from the transparent state to the reflecting state and from the reflecting state to the transparent state, wherein the rear view mirror arrangement is configured to be operated under a camera mode and a mirror mode, wherein when the rear view mirror arrangement is set in the camera mode, the pane is set in the transparent state such that the camera is configured to capture an image of surroundings of the motor vehicle through the transparent pane, and the display unit is configured to display the captured image of the surroundings to a driver of the motor vehicle, wherein when the rear view mirror arrangement is set in the mirror mode, the pane is set in the reflective state such that a mirror image of the surroundings is visible to the driver in the reflecting pane, wherein the control unit is configured to detect a malfunction of the camera or the display unit, and upon detection of the malfunction of the camera or the display unit, change the rear view mirror arrangement from the camera mode to the mirror mode or keep the rear view mirror arrangement set in the mirror mode.

\* \* \* \* \*